US006650446B1

(12) United States Patent
Rozzi

(10) Patent No.: US 6,650,446 B1
(45) Date of Patent: Nov. 18, 2003

(54) COLORIMETRIC CHARACTERIZATION OF SCANNED MEDIA USING SPECTRAL SCANNER AND MEDIA MODELS

(75) Inventor: William A. Rozzi, West Lakeland Township, MN (US)

(73) Assignee: Kodak Polychrome Graphics, Norwalk, CT (US)

( * ) Notice: Subject to any disclaimer, the term of this patent is extended or adjusted under 35 U.S.C. 154(b) by 0 days.

(21) Appl. No.: 09/342,960

(22) Filed: Jun. 29, 1999

(51) Int. Cl.[7] .................................................. G03F 3/08
(52) U.S. Cl. ........................ 358/520; 358/518; 358/1.9
(58) Field of Search ................................ 358/518, 519, 358/520, 406, 504, 505, 474, 1.9; 382/167, 162

(56) References Cited

U.S. PATENT DOCUMENTS

| | | | |
|---|---|---|---|
| 4,500,919 A | 2/1985 | Schreiber | 358/518 |
| 4,951,084 A | 8/1990 | von Stein et al. | 355/38 |
| 4,977,522 A | 12/1990 | David | 382/165 |
| 4,992,963 A | 2/1991 | Funt et al. | 250/226 |
| 5,003,500 A | 3/1991 | Gerber | 356/319 |
| 5,149,960 A | 9/1992 | Dunne et al. | 250/226 |
| 5,375,193 A | 12/1994 | Adams, Jr. | 345/603 |
| 5,377,025 A | 12/1994 | Spaulding et al. | 358/518 |
| 5,463,480 A | * 10/1995 | MacDonald et al. | 358/520 |
| 5,543,940 A | 8/1996 | Sherman | 358/518 |
| 5,579,132 A | 11/1996 | Takahashi et al. | 358/527 |
| 6,088,095 A | * 7/2000 | Sharma | 358/504 |

FOREIGN PATENT DOCUMENTS

| | | |
|---|---|---|
| DE | 4119489 | 11/1991 |
| EP | 0378448 | 7/1990 |
| EP | 1001610 | 5/2000 |
| WO | WO 8000753 | 4/1980 |
| WO | WO 9521502 | 10/1995 |

OTHER PUBLICATIONS

Allen E, "Colorant Formulation and Shading," in Optical Radiation Measurements, vol. 2, Chapter 7, F. Grum and C.J. Bartelson, eds., Academic Press, New York, pp. 289–336 (1980).

Berns RS and Shyu MJ, "Colorimetric Characterization of a Desktop Drum Scanner Using a Spectral Mode," *J. Electronic Imaging* 4(4):360–372 (1995).

Berns RS, "Colorimetric Characterization of Sharp JX610 Desktop Scanner," Munsell Color Science Laboratory Technical Report, Rochester Institute of Technology, pp. 1–19 (1993).

Berns RS, "Spectral Modeling of a Dye Diffusion Thermal Transfer Printer," *J. Electronic Imaging* 2(4):359–370 (1993).

(List continued on next page.)

*Primary Examiner*—Mark Wallerson
(74) *Attorney, Agent, or Firm*—Shumaker & Sieffert, P.A.

(57) ABSTRACT

Modeling spectral characteristics of an image acquisition device. In one implementation, a computer system predicts the spectral reflectance or transmittance of a sample scanned by an image acquisition device, such as a graphics arts scanner, by modeling the device. The sample is scanned by a scanner. The computer system searches for media coordinates in a colorant space corresponding to the sample. The media coordinates correspond to an estimated spectrum in a media model. The estimated spectrum generates estimated digital values through a forward model of the scanner. The estimated digital values are compared to target digital values generated by the scanner to calculate an error value. The computer system repeats this process until a desired stopping criterion or criteria are met. The estimated spectrum corresponding to the final estimated digital values represents the reflectance spectrum of the sample as scanned by the scanner.

34 Claims, 8 Drawing Sheets

OTHER PUBLICATIONS

Chang W and Milch JR, "A Model for Stimulating the Photographic Development Process on Digital Images," in Camera and Input Scanner Systems, Proceedings SPIE—The International Society for Optical Engineering, vol. 1448, San Jose, California (1991) (Best copy available).

Clapper FR, "Color Reproduction," in The Theory of the Photographic Process, pp. 561–577 (1977).

Gorokhovskii YN, "Spectral Studies," The Focal Press, London & New York (1965).

Gschwind R., "Stimulating and Optimizing the Color Reproduction of Photographic Materials," Color Imaging Systems, Royal Photographic Society Symposium, Cambridge, Sep. 1986, M., Pointer, ed., pp. 4–10 (1987).

Hagan GT, "Resampling Methods for Image Manipulation," *The C Users Journal*, pp. 53–58 (1991).

Hamming RW, "Numerical Methods for Scientists and Engineers," 2nd Ed., pp. 657–676, Chapter 43, Optimization, Dover, New York (1973).

Hung P, "Colorimetric Calibration for Scanners and Media," *SPIE Camera and Input Scanner Systems* 1448:164–174 (1991).

Hunt RWG, "The Reproduction of Colour in Photography, Printing & Television," 4th Edition, Fountain Press, England, section 14.17, pp. 257–259 (1987).

Chung, P, "Colorimetric Calibration for Scanners and Media," Proceedings of the SPIE, Feb. 27, 1991, XP000616908.

Johnson T, "Methods for Characterizing Colour Scanners and Digital Cameras," *Displays* 16(4):183–191 (1996).

Kang HR, "Color Scanner Calibration," *J. Imaging Science and Technology* 36(2):162–170 (1992).

Malinowski ER and Howery DG, "Factor Analysis in Chemistry," John Wiley & Sons, New York, Chapters 1–5, pp. 1–117 (1980).

Mancill CE, "Digital Color Image Restoration," Ph.D. Thesis, University of Southern California, pp. 1–143 (1975).

Praefcke W, "Transform Coding of Reflectance Spectra Using Smooth Basis Vectors," *J. Imaging Science and Technology* 40(6)543–548 (1996).

Press WH et al., "Numerical Recipes in C," Second Edition, Cambridge University Press, p. 412–430 (1992).

Rodriquez MA, "Producing Colorimetric Data from Densitomeric Scans," *SPIE* 1913:413–418 (1993).

Saunders AE, "Fitting the Photographic Characteristic Curve: A Functional Equation Approach," *J. Photographic Science* 41:186–193 (1993).

Sharma G and Trussell HJ, "Set Theoretic Estimation of Color Scanner Characterization," *J. Electronic Imaging* 5(4):479–489 (1996).

Sigg F, "Errors in Measuring Halftone Dot Areas," *J. Applied Photographic Engineering* 9(1):27–32 (1983).

Stokes M et al., "Colorimetrically Quantified Visual Tolerances for Pictorial Images," Proc. 1992, vol. 2: Technical Assoc. Graphics Arts and Inter–Society Color Council, Milton Pearson, ed., RIT Research Corporation, Rochester, New York, pp. 757–777 (1992).

Tuijn C, "Input Calibration for Negative Originals," *SPIE* 2414:76–83 (1995).

Viggiano JA, "Modeling the Color of Multi–Colored Halftones," *Proc. TAGA*, pp. 44–62 (1990).

Weisberg S, "Applied Linear Regression, " Chapter 8, p. 190ff, John Wiley & Sons, New York, pp. 1–51 and 182–263 (1980).

* cited by examiner

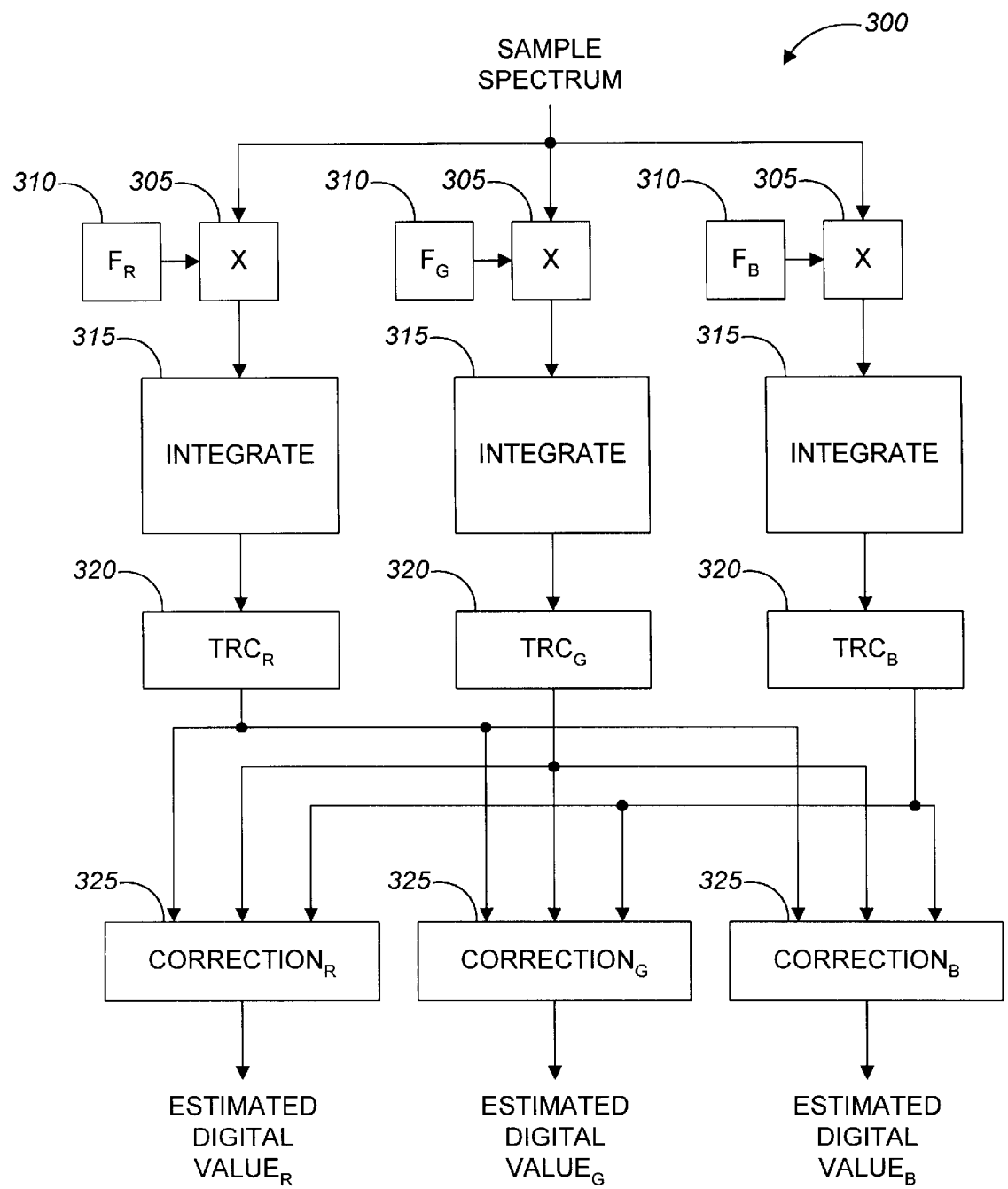

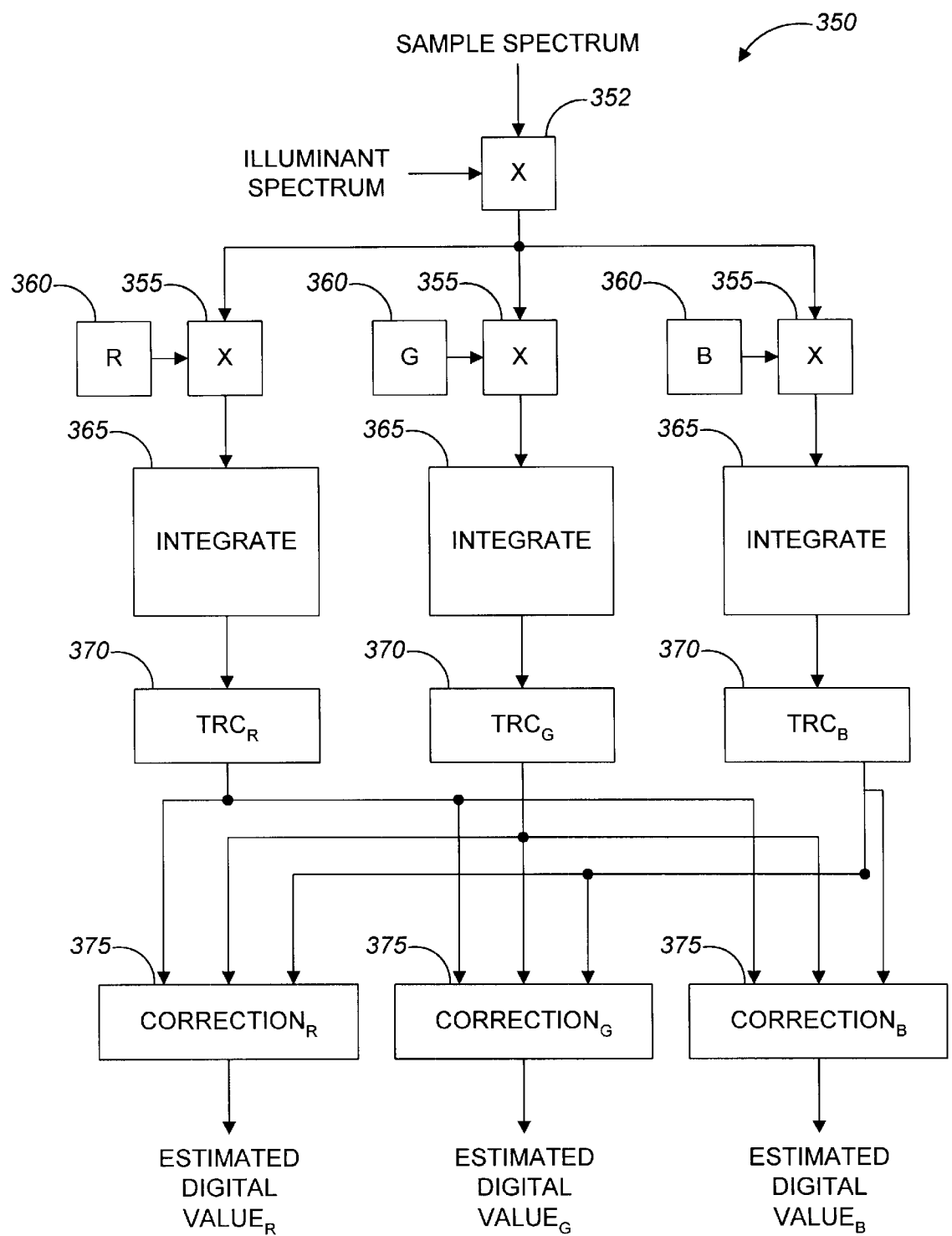

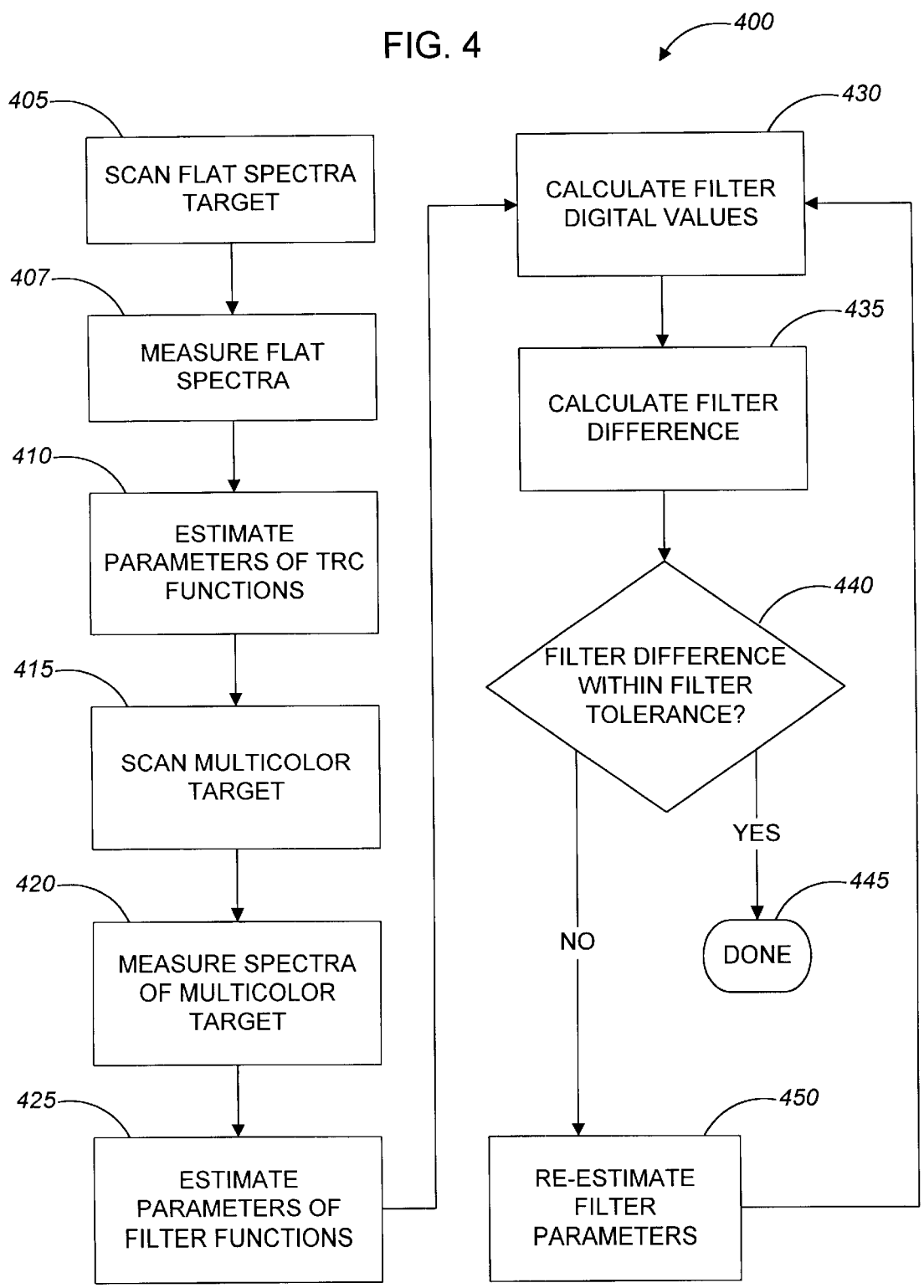

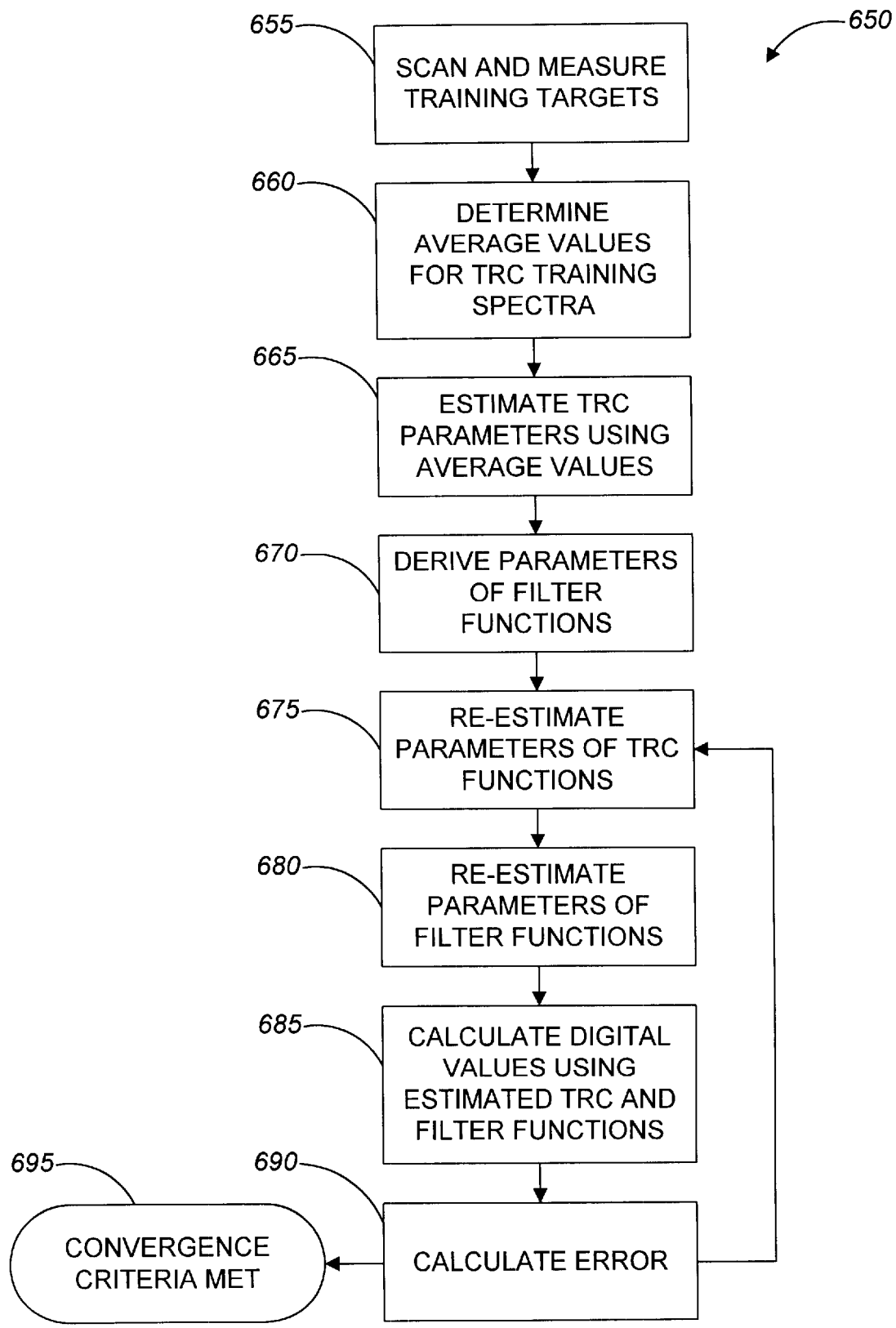

COLORIMETRIC CHARACTERIZATION OF SCANNED MEDIA USING SPECTRAL SCANNER AND MEDIA MODELS

The present application is related to application Ser. No. 09/342,983, entitled "COLORIMETRIC CHARACTERIZATION OF SCANNED MEDIA USING SPECTRAL SCANNER AND BASIS SPECTRA MODELS," to Rozzi, filed Jun. 29, 1999, and application Ser. No. 09/342,568, entitled "SPECTRAL MODELING OF PHOTOGRAPHIC PRINTING BASED ON DYE CONCENTRATION," to Rozzi, filed Jun. 29, 1999, both assigned to the same assignee as the present application, and both of which are incorporated herein by reference.

TECHNICAL FIELD

The invention relates to image acquisition devices such as graphics arts scanners, and more particularly to modeling the spectral behavior of an image acquisition device.

BACKGROUND

Scanners produce digital output values to represent the spectral reflectance of an input sample. A typical scanner illuminates a reflective target using a light source. The scanner=s sensors integrate light that reflects off the sample and passes through a set of spectrally selective filters. The integrated products may be modified by electronics and software to obtain digital output values.

The digital values generated by a scanner are dependent upon the filters and illuminant of the particular scanner and so are not device-independent values. To use the results of scanning a sample on a different device, device-independent values are desirable. Device-independent values include the spectral reflectance of the sample or other derived colorimetric values, such as CIE XYZ or CIE L*a*b* values.

In addition, different reflectance spectra can be perceived by the eye as the same color. Similarly, different spectra can produce the same digital values. This effect is called "metamerism." Metameric samples can produce different colorimetric response values when viewed or scanned under different viewing conditions. As a result, in modeling scanners, many different reflectance spectra can produce the same RGB values. To determine a more accurate estimate of a reflectance spectrum, it is desirable to limit the candidates to avoid metameric matches.

SUMMARY

The invention provides methods and apparatus implementing a technique for modeling spectral characteristics of an image acquisition device. In one implementation, a computer system predicts the spectral reflectance or transmittance of a sample scanned by an image acquisition device, such as a graphics arts scanner, by modeling the device. The sample is scanned by a scanner. The computer system searches for media coordinates in a colorant space corresponding to the sample. The media coordinates correspond to an estimated spectrum in a media model. The estimated spectrum generates estimated digital values through a forward model of the scanner. The estimated digital values are compared to target digital values generated by the scanner to calculate an error value. The computer system repeats this process until a desired stopping criterion or criteria are met. The estimated spectrum corresponding to the final estimated digital values represents the reflectance spectrum of the sample as scanned by the scanner.

In general, in one aspect, the technique includes: (a) estimating media coordinates in a colorant space of a sample scanned by an image acquisition device, where the estimated media coordinates correspond to target digital values produced by the image acquisition device when scanning the sample; (b) converting the estimated media coordinates to an estimated spectrum using a media model corresponding to the sample; (c) estimating digital values by supplying the estimated spectrum to a forward model which models the image acquisition device; (d) identifying an error between the estimated digital values and the target digital values; and (e) if a stopping criterion has not been met, searching the colorant space for media coordinates according to the error using a constrained minimization technique and repeating steps (b) through (e) until the stopping criterion has been met.

Advantages that may be seen in implementations of the invention include one or more of the following: the estimated spectrum is a device-independent and viewing-condition-independent approximation of the spectral reflectance of the sample; the model of the scanner can be used to predict the scanner's output without actually scanning which is useful for experimental purposes; in addition, the media model and the scanner model are independent and so the media model may be changed while still preserving the colorimetric characterization of the scanner. Furthermore, fewer models are required when the media and scanner characterizations are independent characterizations than when the media and scanner characterizations are dependent. For example, if there are M media characterizations and N scanner characterizations, when the characterizations are independent, the total number of models is M+N. When the characterizations are dependent, the total number of models is M×N.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3A is a flow chart of a forward scanner model.

FIG. 3B is a flow chart of an alternative implementation of a forward scanner model.

FIG. 4 is a flow chart of estimating parameters for the inverse model.

FIG. 6B is a flow chart of estimating parameters for the inverse model.

Like reference numbers and designations in the various drawings indicate like elements.

DETAILED DESCRIPTION

Figure 1:
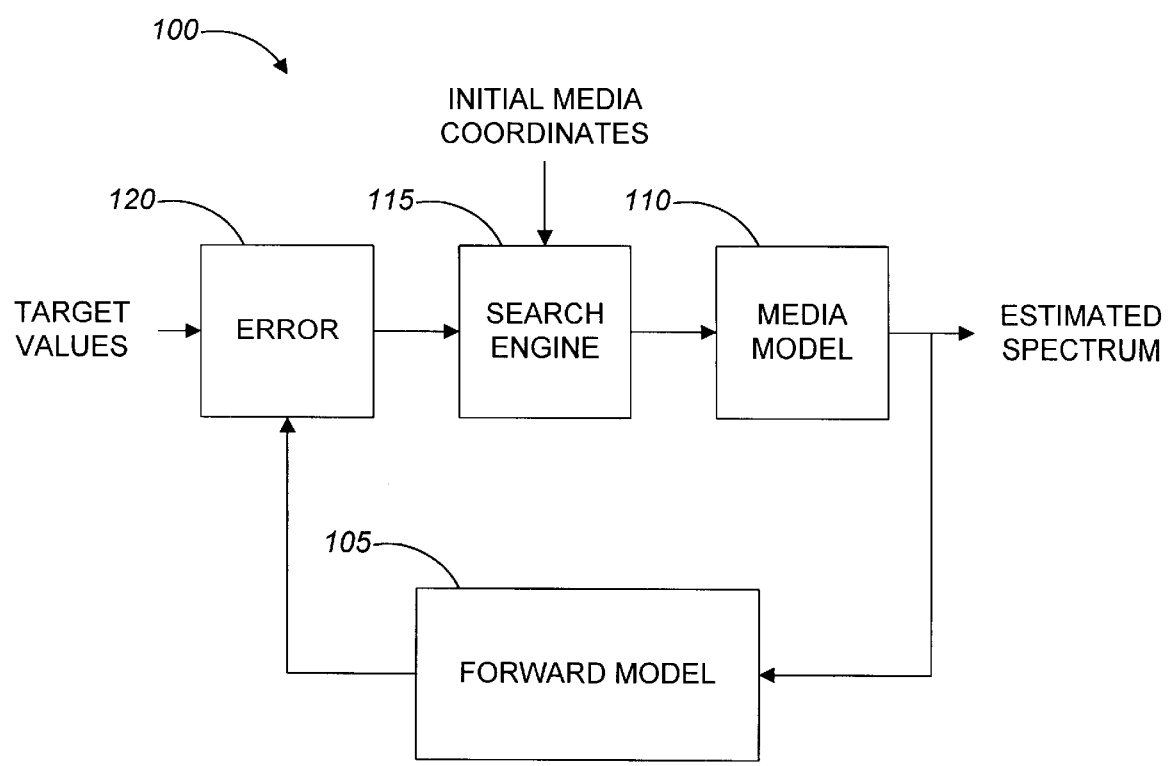
FIG. 1 is a block diagram of an inverse model according to the invention.

In one implementation of the invention, a computer system models the colorimetric behavior of an image acquisition device such as a graphics arts scanner when scanning a sample (i.e., acquiring and processing image information based on spectral energy received from the illuminated sample). As shown in FIG. 1, the computer system employs an inverse model 100 which converts target digital values from the scanner to an estimated spectrum. The scanner has at least one output channel (e.g., R, G, and B) and generates target digital values for each channel. The estimated spectrum can be an estimate of spectral reflectance or spectral transmittance, depending upon the application. The inverse model 100 includes a forward model 105 which estimates digital values for each output channel of the scanner based on a supplied spectrum. The inverse model also includes a media model 110 particular to the media of the sample which translates media coordinates into an estimated spectrum. The media model can be for reflective or transmissive media. The inverse model 100 repeatedly estimates coordinates in a colorant space corresponding to the sample using a search engine 115. The search engine 115 searches in the colorant space based on an error value 120 between target digital values from the scanner and estimated digital values from the forward model 105. The inverse model 100 converts estimated media coordinates to an estimated spectrum through the media model 110 and supplies the estimated spectrum to the forward model 105. The forward model 105 converts the supplied spectrum to estimated digital values. The inverse model 100 compares the estimated digital values to the target digital values to find the error value 120. If a stopping criterion or criteria have not been met, the search engine 115 searches for new media coordinates based on that error value 120 and the process repeats. The stopping criterion can be a specified tolerance for the error value 120, or alternatively can be a different criterion such as a number of iterations. When the stopping criterion has been met, the inverse model 100 recognizes that spectrum as the spectrum which sufficiently-corresponds to the reflective spectrum of the sample.

Figure 2:
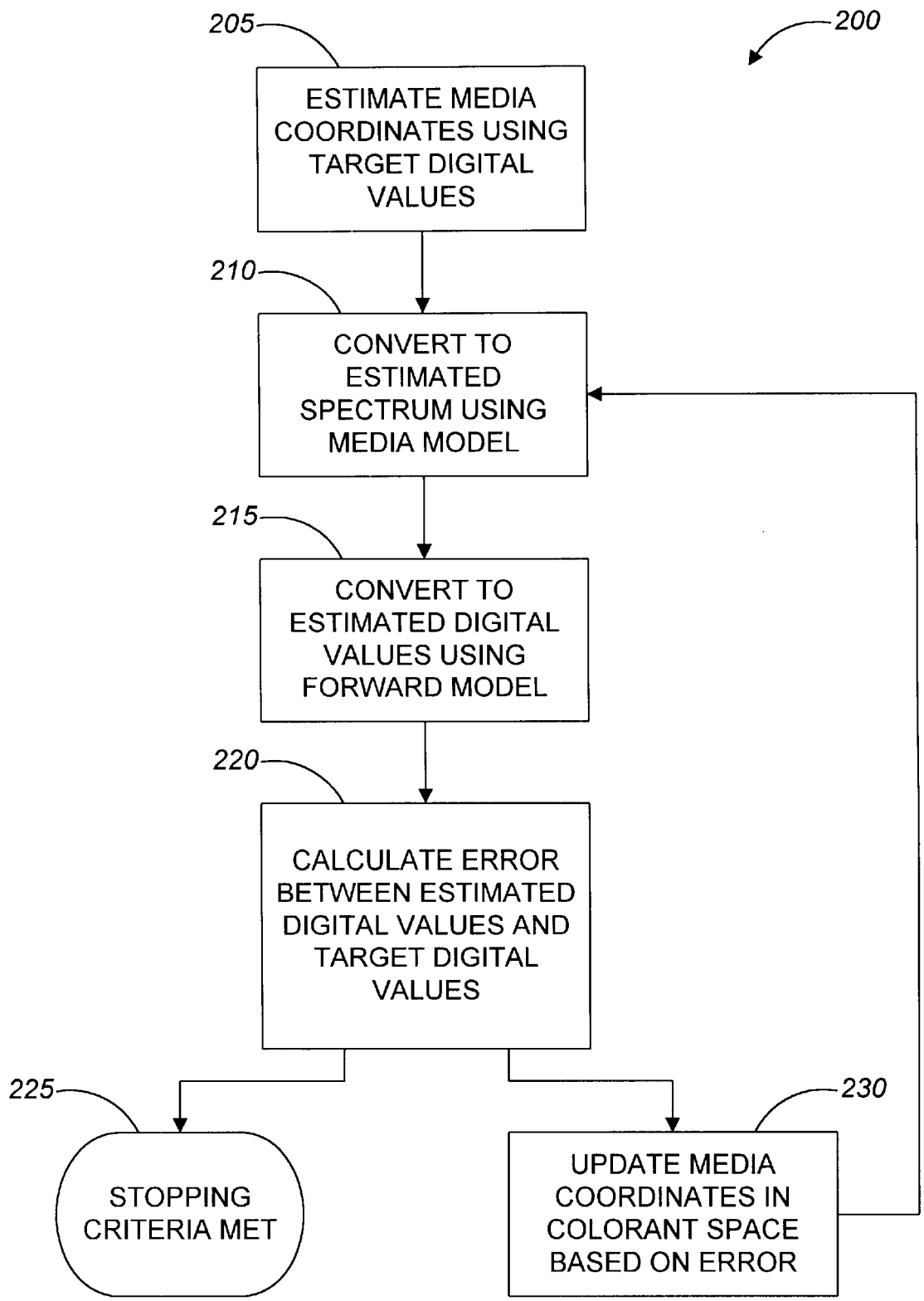
FIG. 2 is a flow chart of the inverse model.

As shown in FIG. 2, in a method 200 of modeling the spectral reflectance of a sample as scanned by a scanner by identifying a predicted spectrum, a computer system estimates media coordinates within a colorant space of a media model corresponding to the sample (step 205). The computer system estimates the media coordinates based on target digital values produced by the scanner. The estimated media coordinates are estimated to correspond to a spectrum which produces the target digital values. The estimation of the initial media coordinates is not critical. The inverse model should converge to an acceptable solution even for "poor" initial estimates. The possibility of converging to an incorrect, metameric match is reduced, however, when the initial estimates are close to their final values. One process for estimating initial media coordinates uses constant initial values from the center of the valid ranges for the media coordinates. An alternative process uses the target RGB values from the scanner or their inverted values as the initial estimates. For example, in one implementation the media model represents media with cyan, magenta, and yellow dyes and all media coordinates and target device values are normalized to a range of zero to one. In this case, initial media coordinates can be computed as the inverted target RGB values:

$$C_0 = 1 - R_{tgt}$$

$$M_0 = 1 - G_{tgt}$$

$$Y_0 = 1 - B_{tgt}$$

where $C_0$, $M_0$, and $Y_0$ are the initial estimated media coordinates and $R_{tgt}$, $G_{tgt}$, and $B_{tgt}$ are the target RGB values. Other processes for estimating the initial media coordinates are possible and should be obvious to one of ordinary skill in the art.

The computer system converts the estimated media coordinates to an estimated spectrum using a spectral media model (step 210). The media model is specific to the media of the sample. One example of a preferred media model is described by Berns in "Spectral Model of a Dye Diffusion Thermal Transfer Printer", Journal of Electronic Imaging, Vol. 2, No. 4, October 1993, pp. 359–70, the disclosure of which is incorporated by reference. The computer system selects media coordinates which are within the colorant space of the media model. Accordingly, the media model limits the spectra under consideration and its use thus limits the resulting metamerism (i.e., different spectral values which appear to produce the same color to a particular viewer or device) in estimating the media coordinates. The media model reduces the metamerism problem by constraining the coordinates to spectra which are observable on the media, eliminating from consideration metameric spectra which the media cannot produce. In addition, the media colorant space has fewer dimensions than a spectral measurement and so searching over the media colorant space is more efficient.

The computer system converts the estimated spectrum to estimated digital values using a forward model of the scanner (step 215). The computer system supplies the estimated spectrum to the forward model and the forward model predicts digital values the scanner would produce for the supplied spectrum in the device-dependent coordinate space of the scanner. The forward model includes filter functions and channel-independent tone reproduction curves ("TRCs") which are specific to the scanner. The forward model optionally includes correction functions to represent channel interaction unaccounted for in other sections of the forward model. The forward model is described in more detail below.

The computer system calculates an error value between the target digital values and the estimated digital values (step 220). The computer system preferably calculates the Euclidean distance between the two sets of digital values. The error value can be a composite error value, including the digital values for all the channels, or an error value particular to each digital value. Alternatively, the calculation of the error value may vary for each digital value. If a specified stopping criterion has been met, the estimated spectrum which produced the current estimated digital values is output as the predicted spectrum (step 225). The stopping criterion can be an error tolerance. In one alternative implementation, each digital value has a different tolerance. In such an implementation, the estimated spectrum is the predicted spectrum when each of the errors is less than the corresponding tolerance. If the stopping criterion has not been met, the computer system "searches" the colorant space of the media model by updating the current media coordinates based on the error to determine new media coordinates (step 230). The search engine preferably maintains statistics of the estimated media coordinates and errors to determine an "error surface" model. The search engine uses the accumulated error surface model and the current error to determine new estimated media coordinates. The search engine preferably uses a numerical minimization technique such as Powell's method or BFGS described by W. H. Press et al. in "Numerical Recipes in C", 2d ed., Cambridge University Press, 1992. This technique is further constrained so that only media coordinates within bounds corresponding to the media model are identified. Thus, the media model restricts the search process, reducing metamerism. The computer system passes the new media coordinates through the media model (step 210) and repeats these steps until the stopping criterion has been met.

As shown in FIG. 3A, in a forward model 300, the computer system receives a sample spectrum. The sample spectrum is multiplied 305 by filter functions 310 corresponding to each channel of the scanner. In an implementation where the scanner has red, green, and blue channels, the forward model includes three filter functions, as shown in FIG. 3A. Each filter function 310 represents the product of a filter transmittance spectrum and an illuminant spectrum. The filter transmittance and illuminant spectra need not be separately determined. Alternatively, the illuminant spectrum can be provided or measured directly, as described below. The filter functions 310 are estimated from training samples, as described below. The products of each filter function and the sample spectrum are integrated 315 over at least one wavelength, such as the visible wavelengths, preferably approximately 380 to 730 nanometers. The integrator outputs thus may be expressed as:

$$r = \int S(\lambda) R(\lambda) I(\lambda) d\lambda$$

$$g = \int S(\lambda) G(\lambda) I(\lambda) d\lambda$$

$$b = \int S(\lambda) B(\lambda) I(\lambda) d\lambda$$

where r, g, and b are the integrator outputs; S is the sample spectrum; R, G, and B are the filter transmittance spectra; I is the illuminant spectrum; and $\lambda$ represents wavelength. As noted above, R, G, B, and I may be expressed as filter functions:

$$F_R(\lambda) = R(\lambda) I(\lambda)$$

$$F_G(\lambda) = G(\lambda) I(\lambda)$$

$$F_B(\lambda) = B(\lambda) I(\lambda)$$

The forward model 300 converts the integrator outputs to digital values using tone reproduction curves ("TRC") 320. The TRCs 320 are one-dimensional transformation functions, such as gain-offset gamma functions, and may be expressed as:

$$d_r = T_R[r] = [k_{gain.r} r + k_{offset.r}]^{\gamma_r}$$

$$d_g = T_G[g] = [k_{gain.g} g + k_{offset.g}]^{\gamma_g}$$

$$d_b = T_B[b] = [k_{gain.b} b + k_{offset.b}]^{\gamma_b}$$

The forward model 300 may optionally adjust these digital values from the TRCs 320 using correction functions 325, as described below.

FIG. 3B shows an implementation of a forward model 350 where the illuminant spectrum is known or measured directly. The operation of the forward model 350 is generally similar to that of the forward model 300 shown in FIG. 3A and described above. The received sample spectrum is multiplied 352 by the supplied illuminant spectrum. This product is multiplied 355 by filter transmittance spectra 360 corresponding to each channel of the scanner. In an implementation where the scanner has red, green, and blue channels, the forward model includes three filter transmittance spectra, as shown in FIG. 3B. The filter transmittance spectra 360 are estimated from training samples using the known illuminant spectrum. Thus, rather than estimating filter functions which represent the products of filter transmittance spectra and an illuminant spectrum as in the forward model 300 of FIG. 3A, the filter transmittance spectra 360 are estimated directly. As above, the resulting products are integrated 365 over the visible wavelengths, preferably approximately 380 to 730 nanometers, and the integrator outputs are converted to digital values TRCs 370. The forward model 350 may optionally adjust these digital values from the TRCs 370 using correction functions 375, as described below.

Before the computer system uses the inverse model to predict the spectral reflectance of the sample, the computer system estimates the parameters of functions within the forward model. As shown in FIG. 4, in a process 400 of estimating parameters, a target having a neutral step wedge is scanned to produce flat sample values (step 405). The neutral step wedge target preferably has reflectance spectra which are substantially flat and a density range which encompasses the density range of most imagery to be digitized by the scanner. The spectra of the target are also measured with a spectrophotometer to produce flat sample spectra (step 407). The spectrophotometer is either reflective or transmissive depending upon the nature of the media.

Figure 5:
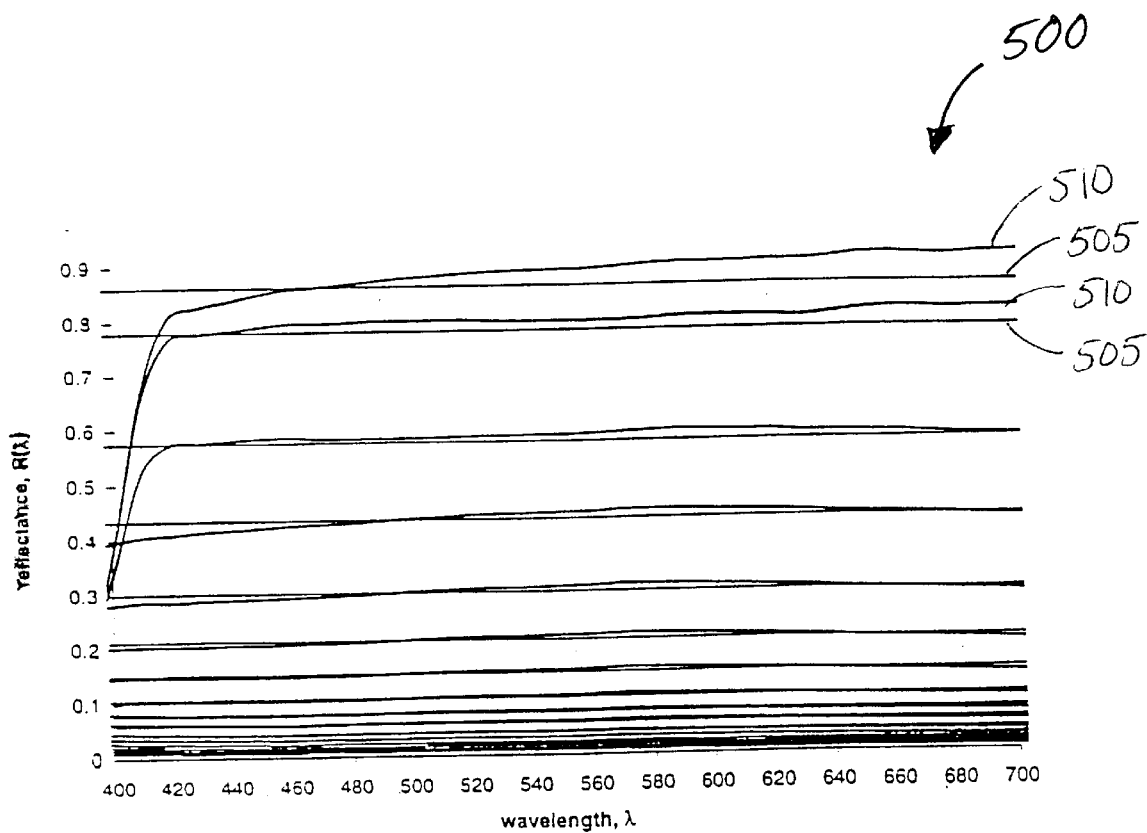
FIG. 5 is a graph of the spectral reflectance of a target with a neutral color wedge.

An example of reflectance spectra 500 from a preferred flat spectra target is shown in FIG. 5. The flat dashed lines 505 are average spectral values for the measured values 510 for each patch over the visible wavelengths (approximately 400 to 700 nm).

For the i-th sample in the flat spectra target, the corresponding measured reflectance spectrum $S_i$ is approximated by a constant, $c_i$, computed by averaging the reflectance spectrum $S_i$ over the visible wavelengths. Accordingly, the integrals described above can be rewritten as (taking r as an example):

$$r_i = c_i \int F_R(\lambda) d\lambda$$

The integral in this equation is also a constant, $\Phi$, independent of the sample spectrum $S_i$. Therefore the TRC for r can be rewritten as:

$$d_r^i = T_R[r_i] = T_R[c_i \Phi] = [k_{gain.r} c_i \Phi + k_{offset.r}]^{\gamma_r}$$

By defining a new gain parameter $k'_{gain.r} = k_{gain.r} \Phi$, then $$d_r^i = T'_R[c_i] = [k'_{gain.r} c_i + k_{offset.r}]^{\gamma_r}$$

Because $S_i$ is substantially flat, this equation does not depend on wavelength and so the TRC function can be sampled at the constant $c_i$. The resulting samples preferably are used to estimate the parameters of the one-dimensional transformation functions with a constrained minimization technique using the flat sample values (step 410). This estimation can be an iterative process which repeats until a specified criterion has been met. When a one-dimensional transformation function is a gain-offset-gamma function, the parameters are gain, offset, and gamma. The gain parameter may be too high by a factor of $\Phi$, but this discrepancy may be compensated for by an implicit scale factor introduced when estimating filter function parameters. The TRC parameters are preferably estimated on a channel-independent basis.

To estimate the filter parameters of the filter functions, a second multicolor target including color samples that span the gamut of a particular printing device is scanned to produce multicolor sample values (step 415). Reflectance spectra of the multicolor target are also measured to produce multicolor sample spectra (step 420). The filter functions are preferably approximated in the forward model by Gaussian functions with three parameters: mean, standard deviation, and amplitude. Alternatively, other functions may be used, such as cubic splines, blobs, summed Gaussians, delta functions, or a combination thereof. For example, for a fluorescent illuminant, a combination of delta and Gaussian functions is preferred. An eight-step sampling of RGB color space (a total of 512 samples) converted to CMYK color space with square-law gray component replacement may produce sufficient accuracy. Alternatively, fewer samples may be used. Given the estimated TRCs, as described above, a constrained minimization technique is preferably used to estimate the filter parameters (step 425). The estimated filter parameters minimize the average color difference between values produced by scanning the multicolor target and values predicted using the estimated filter functions and the measured spectra of the multicolor target. The computer system calculates filter digital values based on the measured spectra of the multicolor target using the forward model and the estimated TRC and filter functions (step 430). In this estimation, the correction functions preferably are not used. The system calculates a filter difference by comparing the filter digital values to the multicolor sample values from scanning the multicolor target (step 435). The filter difference is an average color difference, preferably calculated by finding the average Euclidean distance between paired values. If a filter stopping criterion is met, such as when the filter difference is within a specified filter tolerance (step 440), estimating the filter parameters is complete (step 445). If not, such as when the filter difference is outside the filter tolerance (step 440), the computer system re-estimates the filter functions (step 450) and repeats the above steps 430 to 440. As with the TRCs, the filter parameters are preferably estimated on a channel-independent basis.

Figure 6A:
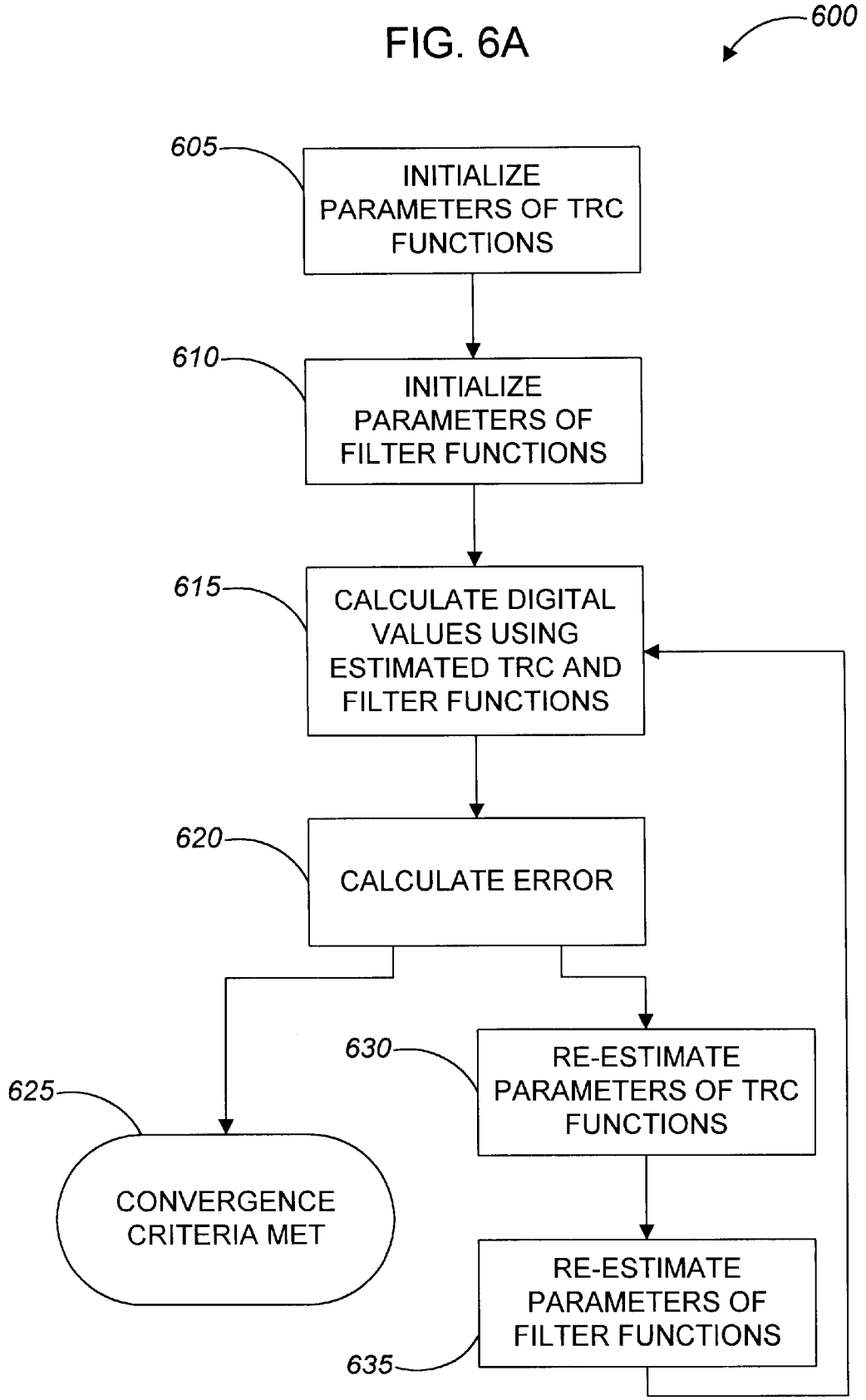
FIG. 6A is a flow chart of estimating parameters for the inverse model.

In an alternative implementation, the TRC and filter function parameters are estimated repeatedly in a construction process until a convergence criterion is met. This convergence criterion can be met when a construction difference is within a construction tolerance, or, alternatively, after a specified number of iterations. As shown in FIG. 6A, in an iterative parameter estimation process 600, the TRC parameters are estimated as described above (step 605). The TRC functions can alternatively be initialized as linear functions. Filter parameters are estimated as described above, including scanning and measuring spectra of a multicolor target (step 610). The filter functions can alternatively be initialized as conventional R, G, and B filter functions, such as wide band Gaussians centered at 450, 550, and 650 nanometers. The computer system estimates construction digital values with the forward model using the estimated TRC functions and filter functions based on measured spectra of the multicolor target (step 615). A construction difference between these construction digital values and the digital values from scanning the multicolor target is calculated (step 620). If the convergence criterion has been met, such as when the construction difference is within the construction tolerance, the computer system is ready to model the scanner with an actual sample (step 625). If not, such as when the construction difference is outside the construction tolerance, the computer system re-estimates the TRC and filter parameters. The estimated filter parameters are used to re-estimate the TRC parameters (step 630). The filter functions are also re-estimated using the re-estimated TRC functions, as described above (step 635). The re-estimated TRC and filter functions are used to calculate new construction digital values (step 615). The process repeats until the construction difference is within the construction tolerance. Alternatively, the computer system also uses correction equations, such as stepwise multiple linear regression functions, to further refine the forward model predictions.

In another alternative implementation where the TRC and filter function parameters are estimated repeatedly in a construction process until a convergence criterion is met, the TRC parameters and filter function parameters are derived from training targets measured with a spectrophotometer. The convergence criterion can be met when a construction difference is within a construction tolerance, or, alternatively, after a specified number of iterations. As shown in FIG. 6B, in an iterative parameter estimation process 650, TRC and filter function training targets, such as the flat and multicolor targets described above, are scanned and measured with a spectrophotometer (step 655). The computer system determines average (constant) values for the TRC training spectra (step 660). The computer system estimates the TRC parameters using the constant values for the TRC training spectra (step 665). The computer system preferably estimates the TRC parameters using a constrained minimization technique. The computer system derives the filter parameters using the measured training samples and constrained minimization (step 670). The computer system replaces the constant TRC training spectra with the actual spectral measurements and re-estimates the TRC parameters (step 675). The computer system uses the re-estimated TRC parameters to re-estimate the filter parameters (step 680). The computer system estimates construction digital values with the forward model using the estimated TRC functions and filter functions based on the measured spectra of the multicolor target (step 685). A difference between these construction digital values and the digital values from scanning the target is calculated (step 690). If the convergence criterion has been met, such as when the construction difference is within the construction tolerance, the computer system is ready to model the scanner with an actual sample (step 695). If not, such as when the construction difference is outside the construction tolerance, the computer system re-estimates the TRC and filter parameters in steps 675 and 680, and the process repeats until the construction difference is within the construction tolerance. Alternatively, the computer system also uses correction equations, such as stepwise multiple linear regression functions, to further refine the forward model predictions.

Optional correction functions (shown as functions 325 in FIG. 3A) are preferably used to refine the estimation of the forward model. While the actual physical process is not clearly understood, there may be channel interaction which the filter functions 310 and TRCs 320 do not reflect. The correction functions 325 represent this channel interaction. The correction functions are preferably multidimensional regression functions. The preferred regression correction functions may be formed as a linear combination of a set of predictor functions which are themselves functions of the TRC output values. Considering the red channel, the regression function may be written as:

$$d'_r = \sum_{i=1}^{N_{pred}} \beta_i f_i(d_r, d_g, d_b) + \beta_0$$

to where $d'_r$ is the corrected model output; $d_r$, $d_g$, and $d_b$ are the TRC output values; $f_i(d_r, d_g, d_b)$ is the i-th predictor function; $\beta_i$ is the i-th regression parameter; and $N_{pred}$ is the number of predictor functions in the regression. The specification of the form of the predictor functions is subjective. For example, when modeling RGB scanner output, the predictor functions could be selected to be:

$$f_1(d_r,d_g,d_b)=d_r$$

$$f_2(d_r,d_g,d_b)=d_g$$

$$f_3(d_r,d_g,d_b)=d_b$$

$$f_4(d_r,d_g,d_b)=d_r^2$$

$$f_5(d_r,d_g,d_b)=d_r d_g$$

$$f_6(d_r,d_g,d_b)=d_r d_b$$

$$f_7(d_r,d_g,d_b)=d_g^2$$

$$f_8(d_r,d_g,d_b)=d_g d_b$$

$$f_9(d_r,d_g,d_b)=d_b^2$$

Given a specification of the predictor functions, the regression parameters $\{\beta_i\}$ can be determined via a standard stepwise regression process such as that described by S. Weisberg in "Applied Linear Regression" Chapter 8, p 190ff, John Wiley and Sons, New York 1980, the disclosure of which is incorporated by reference. Stepwise regression with a 95% confidence level can be used with the digital values from the TRCs 320 and their combinations as the regression variables and the scanner RGB values from the scanner as the data to be fit. These correction functions 325 often have a dominant linear term indicating the forward model 300 accounts for most of the behavior of the scanner. Accordingly, each correction function 325 receives all the digital values from the TRCs 320 and generates an estimated digital value for the respective R, G, B channel.

The invention may be implemented in hardware or software, or a combination of both. However the invention preferably is implemented in computer programs executing on programmable computers each comprising a processor a data storage system (including volatile and nonvolatile memory and/or storage elements), at least one input device, and at least one output device. Program code is applied to input data to perform the functions described herein and generate output information. The output information is applied to one or more output devices, in known fashion.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CDROM, or magnetic media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of implementations of the present invention have been described. Nevertheless, it will be understood that various modifications may be made without departing from the spirit and scope of the invention. Additional variations are possible, such as using CMY for the forward model instead of RGB. The filter functions can also be provided or measured directly. The technique is not limited to modeling scanner behavior, but can be applied to other image acquisition devices as well. For example, the invention could also be applied to digital cameras. Accordingly, it is to be understood that the invention is not to be limited by the specific illustrated embodiments, but only by the scope of the appended claims.

What is claimed is:

1. A method of modeling spectral characteristics of an image acquisition device, comprising:
   (a) estimating media coordinates in a colorant space of a sample scanned by an image acquisition device, where the estimated media coordinates correspond to target digital values produced by the image acquisition device when scanning the sample;
   (b) converting the estimated media coordinates to an estimated spectrum using a media model corresponding to the sample;
   (c) estimating digital values by supplying the estimated spectrum to a forward model which models the image acquisition device;
   (d) identifying an error between the estimated digital values and the target digital values; and
   (e) if a stopping criterion has not been met, searching the colorant space for media coordinates according to the error using a constrained minimization technique and repeating steps (b) through (e) until the stopping criterion has been met.

2. The method of claim 1, where the image acquisition device is a scanner.

3. The method of claim 1, where the stopping criterion is met if the error is within a tolerance.

4. The method of claim 1, where identifying the error comprises calculating a Euclidian distance between the estimated digital values and the target digital values.

5. The method of claim 1, where said searching the colorant space includes updating the media coordinates according to the error.

6. The method of claim 1, where said searching the colorant space using a constrained minimization technique includes using a numerical minimization technique constrained so as not to identify media coordinates outside bounds corresponding to the sample.

7. The method of claim 1, where the image acquisition device has at least one output channel, and the forward model comprises, for each output channel of the image acquisition device:
   multiplying a sample spectrum supplied to the forward model and a value of a filter function to produce a spectral product, where the value of the filter function represents a product of a filter transmittance spectrum corresponding to a filter of the image acquisition device and an illuminant spectrum corresponding to an illuminant;
   integrating the spectral product over at least one wavelength to produce an integral value; and
   converting the integral value into an estimated digital value by applying a one-dimensional transformation function to the integral value.

8. The method of claim 7, where the spectral product is integrated over the visible wavelengths.

9. The method of claim 7, further comprising:
   applying a multidimensional regression function to the estimated digital values to model channel interaction in the image acquisition device.

10. The method of claim 7, where the one-dimensional transformation function is a gain-offset-gamma function.

11. The method of claim 10, further comprising estimating parameters of the gain-offset-gamma function, where such estimation comprises:
   scanning a flat spectra target to produce flat sample values, where the flat spectra target includes a neutral color wedge such that spectra are substantially constant at each visible wavelength;

measuring flat sample spectra of the flat spectra target; and estimating gain, offset, and gamma parameters based upon the flat sample values and the flat sample spectra using a constrained minimization technique.

12. The method of claim 7, further comprising estimating filter parameters of the filter function, where such estimation comprises:

scanning a multicolor target to produce multicolor sample values, where the multicolor target includes colors spanning a gamut of a printing device which produced the multicolor target;

measuring multicolor sample spectra of the multicolor target;

estimating filter parameters of the filter function based on the multicolor sample values and the multicolor sample spectra using a constrained minimization technique;

calculating filter digital values by supplying the multicolor sample spectra to the forward model and using the estimated filter functions;

calculating a filter difference by comparing the filter digital values to the multicolor sample values; and if a filter stopping criterion has not been met, re-estimating the filter parameters based on the filter difference and repeating the steps of calculating filter digital values, calculating the filter difference, and re-estimating the filter parameters until the filter stopping criterion has been met.

13. The method of claim 12, where the filter stopping criterion is met if the filter difference is within a filter tolerance.

14. The method of claim 12, where:

the filter functions are Gaussian functions; and the filter parameters include mean, standard deviation, and amplitude.

15. The method of claim 12, where the one-dimensional transformation function is a gain-offset-gamma function, and the method further comprises:

estimating gain-offset-gamma parameters for the gain-offset-gamma function;

calculating construction digital values using the gain-offset-gamma function and filter function with the respective estimated parameters;

calculating a construction difference based on the construction digital values and the multicolor sample values; and if a convergence criterion has not been met, re-estimating the gain-offset-gamma parameters and the filter parameters until the convergence criterion is met.

16. The method of claim 15, where the convergence criterion is met if the construction difference is within a construction tolerance.

17. The method of claim 15, where estimating gain-offset-gamma parameters comprises:

scanning a flat spectra target to produce flat sample values, where the flat spectra target includes a neutral color wedge such that spectra are substantially constant at each visible wavelength;

measuring flat sample spectra of the flat spectra target; and estimating gain, offset, and gamma parameters based upon the flat sample values and the flat sample spectra using a constrained minimization technique.

18. The method of claim 7, where the one-dimensional transformation function is a gain-offset-gamma function, and the method further comprises:

scanning a flat spectra target to produce flat sample values, where the flat spectra target includes a neutral color wedge such that spectra are substantially constant at each visible wavelength;

measuring flat sample spectra of the flat spectra target;

scanning a multicolor target to produce multicolor sample values, where the multicolor target includes colors spanning a gamut of a printing device which produced the multicolor target;

measuring multicolor sample spectra of the multicolor target;

determining flat average values based on the flat sample values;

estimating gain-offset-gamma parameters for the gain-offset-gamma function based on the flat average values and the flat sample spectra using constrained minimization;

estimating filter parameters for the filter functions based on the multicolor sample values and the multicolor sample spectra using constrained minimization;

re-estimating the gain-offset-gamma parameters using the flat sample spectra;

re-estimating the filter parameters using the re-estimated gain-offset-gamma functions;

calculating construction digital values using the gain-offset-gamma function and filter function with the respective re-estimated parameters based on the multicolor sample spectra;

calculating a construction difference based on the construction digital values and the multicolor sample values; and if a convergence criterion has not been met, re-estimating the gain-offset-gamma parameters and the filter parameters until the convergence criterion is met.

19. The method of claim 1, where the image acquisition device has at least one output channel, and the forward model comprises, for each output channel of the image acquisition device:

multiplying a sample spectrum supplied to the forward model and an illuminant spectrum corresponding to an illuminant to produce a first spectral product;

multiplying the first spectral product by a filter transmittance spectrum corresponding to a filter of the image acquisition device to produce a second spectral product;

integrating the second spectral product over at least one wavelength to produce an integral value; and converting the integral value into an estimated digital value by applying a one-dimensional transformation function to the integral value.

20. The method of claim 19, further comprising applying a multidimensional regression function to the estimated digital values.

21. The method of claim 19, where the one-dimensional transformation function is a gain-offset-gamma function.

22. A method of modeling spectral characteristics of an image acquisition device, comprising:

(a) estimating media coordinates in a colorant space of a sample scanned by an image acquisition device, where the estimated media coordinates correspond to target digital values produced by the image acquisition device when scanning the sample;

(b) converting the estimated media coordinates to an estimated spectrum using a media model corresponding to the sample;

(c) estimating digital values by supplying the estimated spectrum to a forward model which models the image acquisition device, where the forward model includes applying multidimensional regression functions to produce the estimated digital values;

(d) identifying an error between the estimated digital values and the target digital values; and (e) if a stopping criterion has not been met, searching the colorant space for media coordinates according to the error and repeating steps (b) through (e) until the stopping criterion has been met.

23. A method of modeling spectral characteristics of an image acquisition device, comprising:

iteratively updating media coordinates corresponding to an estimated spectrum until a stopping criterion is met, where the media coordinates are in a colorant space of a sample scanned by an image acquisition device; and constraining said updating using a media model corresponding to the sample with a constrained minimization process.

24. The method of claim 23, where the image acquisition device is a scanner.

25. The method of claim 23, where the stopping criterion is met when an error is within a tolerance, where the error is generated by comparing estimated digital values generated by a forward model of the image acquisition device to target digital values generated by the image acquisition device.

26. The method of claim 23, further comprising:

estimating parameters for the forward model using targets scanned by the image acquisition device.

27. The method of claim 23, further comprising:

iteratively estimating parameters for the forward model using targets scanned by the image acquisition device until a forward model stopping criterion is met.

28. The method of claim 23, where the forward model stopping criterion is met when a forward model error is within a forward model tolerance.

29. The method of claim 23, where:

the forward model includes multidimensional regression functions to model channel interaction in the image acquisition device.

30. A method of estimating a digital value produced by a graphic arts scanner when scanning a sample illuminated by an illuminant, comprising:

multiplying a sample spectrum corresponding to a sample being scanned by an image acquisition device and a value of a filter fiction to produce a spectral product, where the value of the filter function represents a product of a filter transmittance spectrum corresponding to a filter of the image acquisition device and an illuminant spectrum corresponding to an illuminant applied to the sample;

integrating the spectral product over visible wavelengths to produce an integral value; and converting the integral value into an estimated digital value by applying a one-dimensional transformation fiction to the integral value.

31. The method of claim 30, further comprising applying a multidimensional regression function to the estimated digital value.

32. The method of claim 30, where the one-dimensional transformation function is a gain-offset-gamma function.

33. A computer program, residing on a computer-readable medium, for modeling spectral characteristics of an image acquisition device, the computer program comprising instructions for causing a computer to:

(a) estimate media coordinates in a colorant space of a sample scanned by an image acquisition device, where the estimated media coordinates correspond to target digital values produced by the image acquisition device when scanning the sample;

(b) convert the estimated media coordinates to an estimated spectrum using a media model corresponding to the sample;

(c) estimate digital values by supplying the estimated spectrum to a forward model which models the image acquisition device;

(d) identify an error between the estimated digital values and the target digital values; and (e) when a stopping criterion has not been met, search the colorant space for media coordinates according to the error using a constrained minimization technique and repeat steps (b) through (e) until the stopping criterion has been met.

34. In a computer system, a model for modeling spectral characteristics of an image acquisition device, comprising:

(a) means for estimating media coordinates in a colorant space of a sample scanned by an image acquisition device, where the estimated media coordinates correspond to target digital values produced by the image acquisition device when scanning the sample;

(b) means for converting the estimated media coordinates to an estimated spectrum using a media model corresponding to the sample;

(c) means for estimating digital values by supplying the estimated spectrum to a forward model which models the image acquisition device;

(d) means for identifying an error between the estimated digital values and the target digital values; and (e) means for searching the colorant space for media coordinates according to the error using a constrained minimization technique and repeating steps (b) through (e) until a stopping criterion has been met.

* * * * *

UNITED STATES PATENT AND TRADEMARK OFFICE
CERTIFICATE OF CORRECTION

PATENT NO. : 6,650,446 B1  
DATED : November 18, 2003  
INVENTOR(S) : William A. Rozzi Page 1 of 1

It is certified that error appears in the above-identified patent and that said Letters Patent is hereby corrected as shown below:

Column 13,  
Line 52, "fiction" should read -- function --

Column 14,  
Line 7, "fiction" should read -- function --

Signed and Sealed this

Fifth Day of July, 2005

JON W. DUDAS  
*Director of the United States Patent and Trademark Office*